(12) United States Patent
Sorimoto

(10) Patent No.: US 8,226,404 B2
(45) Date of Patent: Jul. 24, 2012

(54) UNDERCUT PROCESSING MECHANISM

(75) Inventor: Masanori Sorimoto, Hiroshima (JP)

(73) Assignee: Technocrats Corporation, Hiroshima (JP)

( * ) Notice: Subject to any disclaimer, the term of this patent is extended or adjusted under 35 U.S.C. 154(b) by 147 days.

(21) Appl. No.: 12/744,555

(22) PCT Filed: Nov. 25, 2008

(86) PCT No.: PCT/JP2008/071287
§ 371 (c)(1),
(2), (4) Date: May 25, 2010

(87) PCT Pub. No.: WO2009/069568
PCT Pub. Date: Jun. 4, 2009

(65) Prior Publication Data
US 2010/0247701 A1    Sep. 30, 2010

(30) Foreign Application Priority Data
Nov. 27, 2007  (JP) .................................. 2007-305378

(51) Int. Cl.
*B29C 45/44* (2006.01)
(52) U.S. Cl. .................. 425/577; 425/438; 425/DIG. 58
(58) Field of Classification Search .................. 425/190, 425/438, 441, 442, 443, 556, 577, 595, DIG. 58
See application file for complete search history.

(56) References Cited

U.S. PATENT DOCUMENTS 5,403,179 A * 4/1995 Ramsey ......................... 425/577
7,293,341 B2   11/2007 Zydron
8,002,538 B2 * 8/2011 Zydron ......................... 425/577

FOREIGN PATENT DOCUMENTS
JP    10-000660    1/1998

OTHER PUBLICATIONS

European Patent Office, Extended European Search Report for European Patent Application 08855522.2, Jul. 26, 2011.

* cited by examiner

*Primary Examiner* — Richard Crispino
*Assistant Examiner* — Thukhanh Nguyen
(74) *Attorney, Agent, or Firm* — Kuberta & Associates, LLC

(57) ABSTRACT

An undercut processing mechanism can facilitate punching-out of undercut portions having various shapes spreading in the circumferential direction on the inside of a molded article. Split cores (61) that form an undercut molding core (60) are supported one by one at the leading end of slide members (50) disposed radially to face the center axis of an undercut portion (P3). Each slide member (50) is housed in a holder (40) so as to be slidable between a molding position where the split cores (61) are mutually disposed in the entire circumferential direction and a demolding position where the split cores (61) are mutually reduced in diameter. The holder (40) is provided with a guide member (46) for guiding each slide member (50) to move simultaneously in the punching-out direction parallel to the center axis of the undercut portion (P3) and in the direction escaping from the undercut portion (P3) toward the center axis of the undercut portion (P3), respectively, along an inclination direction from the molding position toward the demolding position.

6 Claims, 10 Drawing Sheets

(a)

(b)

(a)

(b)

(a)

(b)

(a)

(b)

UNDERCUT PROCESSING MECHANISM

TECHNICAL FIELD

The present invention relates to an undercut processing mechanism in a molding device for molding with a stationary mold and a movable mold an article to be molded, which mechanism brings an undercut portion formed inside the molded article in the circumferential direction when punching out the molded article to a detachable state.

BACKGROUND ART

When an article to be molded is provided therein with an undercut portion spreading in the circumferential direction thereof, the punching-out of the undercut portion of the molded article has heretofore been performed forcibly so as to push and spread the undercut portion of the molded article to an extent enabling the punching-out utilizing elastic deformation of the material of the molded article. In performing the punching-out forcibly, however, the material of the molded article has been limited to a material capable of being elastically deformed with ease and problems of demolding failure and production of molded articles forming cracks therein has been entailed.

As a mechanism to solve the problems imposed by the forcible punching-out, there has been known a mechanism comprising plural cores lining radially as so-called collapsible cores and a center pin movably disposed at the center of the cores and having a structure in which the center pin is pushed in the inside of each core to expand a segment portion on the outer periphery of each core to a shape or size corresponding to that of an undercut portion, whereas the center pin is pulled out utilizing the opening or closing motion of a mold to move each core inward in the radial direction of the center pin, thereby reducing the core in diameter.

In addition, as an undercut processing mechanism different from the mechanism using the collapsible cores, there has also been known a mechanism comprising a first side plate provided on the upper side thereof with an undercut mold core portion and divided into two portions performing opening and closing in a vertical direction relative to the opening and closing direction of a mold and a second side plate similarly provided on the upper side thereof with an undercut mold core portion and divided into two portions performing opening and closing in the direction orthogonal to the opening and closing direction of the first side plate, thereby solving the drawbacks of the mechanism using the collapsible cores, which include growth in size and poor durability (refer, for example to JP 10-000660 A).

DISCLOSURE OF THE INVENTION

However, any of the conventional techniques forgoing the forcible punching-out, as described above, has only replied to the undercut portion having a shape capable of being punched out in the direction intersecting at right angles relative to the opening and closing direction of the mold. For this reason, the shape or position of the undercut portion in a moldable article is limited to a very narrow range. This is problematic.

In addition, in comparison with the amount of movement of the collapsible core or undercut mold portion required to push out the undercut portion of the molded article, the mechanism to drive these have problems of requiring a larger installation space, being complicated in entire structure, requiring time and labor for the assemblage thereof and being difficult to reduce the cost.

The present invention has been accomplished focusing on the problems imposed by the conventional techniques and the object thereof is to provide an undercut processing mechanism which is capable of punching out undercut portions of various shapes spreading inside a molded article in the circumferential direction with ease, providing a compact configuration, replying to a demand for space saving and facilitating processing and incorporation relative to a mold, which is simple in structure and which does not require time and labor for the assemblage thereof.

The gist of the present invention to attain the above object lies in the invention set forth in each of the following items.

[1] An undercut processing mechanism in a molding device for molding an article to be molded with a stationary mold and a movable mold brings an undercut portion formed inside the molded article in a circumferential direction thereof at a time of punching out the molded article to a detachable state and comprises an undercut mold core comprising plural split cores that line one another in an entire circumferential direction to correspond in position to an inner peripheral surface of the undercut portion, the split cores comprising inner split cores and outer split cores formed to line alternately, the inner split cores abutting on one another and formed on an inner side and the outer split cores coming close to one another along an outer side of the inner split cores when the split cores have been reduced in diameter toward an center axis of the undercut portion; slide members radially disposed and opposed to the center axis of the undercut portion in a state in which each of the slide members supports each of the split cores of the undercut mold cores on a leading end thereof; a holder provided integrally with the stationary mold or movable mold for housing the slide members slidably between a molding position at which the split cores supported on the leading ends of the slide members, respectively, line one another in the entire circumferential direction and a demolding position at which the split cores are reduced in diameter one another toward the center axis of the undercut portion; and guide means disposed in the holder for guiding, at the time of punching out the molded article, the slide members to move simultaneously in a punching-out direction parallel to the center axis of the undercut portion and in a direction escaping from the undercut portion toward the center axis of the undercut portion, respectively, along an inclination direction from the molding position to the demolding position.

[2] In an undercut processing mechanism set forth in item [1], the split cores are provided on outer sides thereof with molding surfaces continuing to one another in the entire circumferential direction at the molding position; the inner split cores of the split cores are provided with slid-contact surfaces extending aslant from opposite ends of the molding surfaces toward the center axis of the undercut portion so as to spread out wide toward ends thereof; the outer split cores of the split cores are provided with sliding-contact surfaces which extend aslant from the opposite ends of the molding surfaces toward the center axis of the undercut portion so as to tuck toward ends thereof and which are brought into slide contact with the slid-contact surfaces; and when the split cores have moved from the molding position to the demolding position, respectively, the sliding-contact surfaces of the outer split cores come into slide contact with the slid-contact surfaces of the inner split cores to dispose the outer split cores on upper outside of the inner split cores.

[3] An undercut processing mechanism set forth in item [1] or [2], further comprises ejector pins driven in the punching-out direction to project out, wherein the holder is integrally provided with the movable mold in a state in which leading ends of the ejector pins are movably guided, the slide members have proximal ends thereof connected slidably in the escaping direction to the leading ends of the ejector pins and the guide means comprises guide holes which are formed in the holder and along which the slide members are movably guided in the inclination direction, with midway portions of the slide members passing through the guide holes.

[4] In an undercut processing mechanism set forth in item [1], [2] or [3], the split cores of the undercut mold core are formed integrally on leading ends of the slide members corresponding thereto, respectively.

[5] In an undercut processing mechanism set forth in item [1], [2] or [3], the split cores of the undercut mold core are detachably combined as separate bodies with leading ends of the slide members corresponding thereto, respectively.

[6] In an undercut processing mechanism set forth in item [1], [2], [3], [4] or [5], the slide members are set to have a length corresponding to a punching-out stroke of the molded article.

[7] In an undercut processing mechanism set forth in item [1], [2], [3], [4], [5] or [6], the holder per se is constituted as the movable mold or stationary mold provided therein with the holder.

The present invention functions as follows. According to the undercut processing mechanism set forth in item [1] above, the undercut mold core comprises the plural split cores lining one another in the entire circumferential direction so as to correspond in position to the inner peripheral surface of the undercut portion of the molded article. Here, when the split cores have been reduced in diameter toward the center axis of the undercut portion spreading in the circumferential direction inside the molded article, the inner split cores positioned on the inner side while abutting on one another and the outer split cores coming close to one another along the outer side of the inner split cores are formed to line alternately.

Thus, the inner split cores and outer split cores line alternately to form the annular undercut mold core, two cores, i.e. one inner split core and adjacent one outer split core, form a pair, and the inner split cores and the same number of the outer split cores exist by necessity. These split cores are supported on the leading ends of the slide members, respectively. The slide members are radially disposed to face one another within the holder integrally formed with the stationary mold or movable mold, with the center axis of the undercut portion extending in the punching-out direction as the center.

The slide members can slide within the holder between the molding position at which the split cores supported on the leading ends thereof, respectively, line one another in the entire circumferential direction and the demolding position at which the split cores are reduced in diameter, respectively, toward the center axis of the undercut portion. As a result, even in the presence of the undercut portion spreading in the circumferential direction inside the molded article, the punching-out operation can easily be performed without performing a forcible punching-out operation.

Furthermore, at the time of punching out the molded article, the slide members are guided by the guide means disposed in the holder to move simultaneously in the punching-out direction parallel to the center axis of the undercut portion and in the direction escaping from the undercut portion toward the center axis of the undercut portion, respectively, along an inclination direction from the molding position to the demolding position. Therefore, the slide members or split cores move infallibly from the molding position to the demolding position.

Here, the direction escaping from the undercut portion is not limited to a direction orthogonal to the punching-out direction, but may be a direction intersecting with the punching-out direction toward the center axis of the undercut portion, in brief. For this reason, the shape of the undercut portion is not limited to the one to be punched out in a direction intersecting at right angles with the punching-out direction, and the undercut portions having various kinds of shapes spreading in the circumferential direction inside the molded article can easily be punched out.

According to the undercut processing mechanism as described above, it is possible to simplify the whole structure and reduce the manufacturing cost to a great extent. In addition, the slide members can be disposed in a focused way only on either one of the stationary mold and the movable mold via the holder without being disposed on the ejector bedplate and the movable mold in a dispersed state. As a result, it is possible to attain a compact configuration, reply to a demand for space saving and facilitate processing and incorporation relative to the mold.

According to the undercut processing mechanism set forth in item [2] above, when the split cores moves from the molding position to the demolding position, respectively, while the sliding-contact surface of the outer split core comes into slide contact with the slid-contact surface of the inner split core, the outer split core is positioned above the outer side of the inner split core. With this design, it is possible to increase diameter-reduction ratio in the undercut mold core and produce the molded article having an undercut portion with deep bottom.

The undercut processing mechanism set forth in item [3] above is operated in accordance with the projecting motion of the ejector pins driven in the punching-out direction when the molded article is punched out. When the stationary mold departs from the movable mold upon completion of the molding operation, the outside of the molded article emerges. Then, the ejector pins project to separate the molded article from the movable mold for punching out the molded article and the leading ends of the ejector pins move within the holder.

At this time, the slide members connected to the leading ends of the ejector pins are guided in the inclination direction, by means of the guide holes formed in the holder as the guide means, in association with the projecting motion of the ejector pins. As a result, since the split cores infallibly move from the molding position to the demolding position, the undercut portion of the molded article is brought to a detachable state, thereby enabling the molded article to be punched out.

According to the undercut processing mechanism set forth in item [4] above, each slide member is provided on the leading end thereof integrally with the split core constituting the undercut mold core. As a result, it is possible to attain a further simple structure and cost reduction.

According to the undercut processing mechanism set forth in item [5] above, the split core constituting the undercut molding core is detachably attached as a separate body to the leading end of each slide member. As a result, it is possible to attach any of various kinds of undercut mold cores instead to the leading end, thereby expanding the versatility.

According to the undercut processing mechanism set forth in item [6] above, the slide members are set to have a length in accordance with the punching-out stroke of the molded article. As a result, it is possible to reply to strokes in punching out the molded article from a small stroke to a large stroke properly.

According to the undercut processing mechanism set forth in item [7] above, the holder per se is constituted as the movable mold or the stationary mold provided therein with the holder. That is to say, the mold is directly formed therein with a hollow portion, instead of the inside space of the holder, in which the slide members are housed slidably between the molding position and the demolding position. As a result, no parts for the holder is required to reduce the number of component parts and further simplify the entire configuration of the molding device, thereby enabling the cost to be reduced.

BEST MODE FOR CARRYING OUT THE INVENTION

Figure 1:
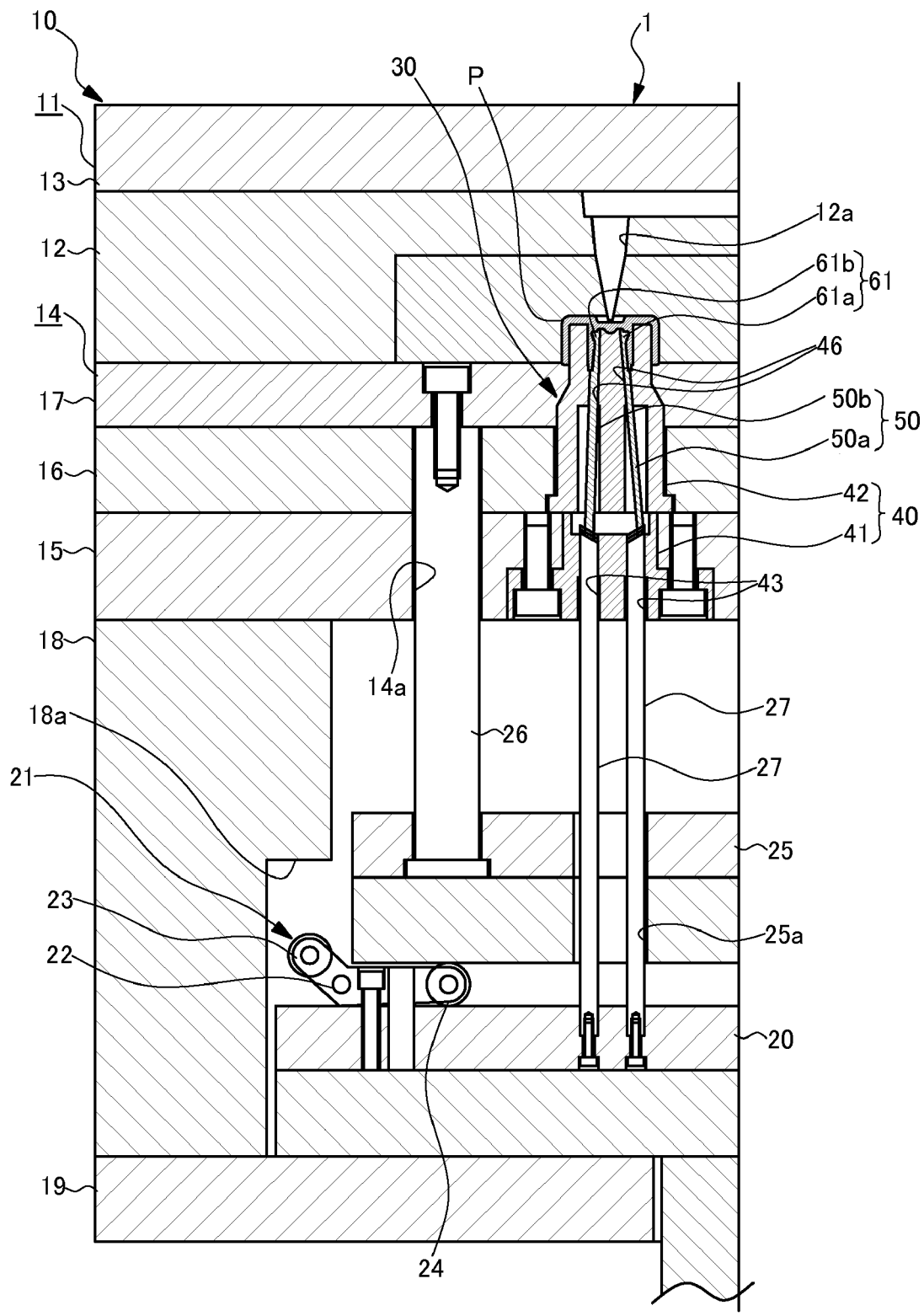
FIG. 1 is a cross-sectional view illustrating a molding device and the movement of an undercut processing mechanism during the course of molding, according to an embodiment of the present invention.

An embodiment representing the present invention will be described hereinafter on the basis of the drawings. FIGS. 1 to 4 are cross-sectional views illustrating a molding device 1 and the movements of a mold 10 and an undercut processing mechanism 30 constituting the molding device 1. The molding device 1 is a device adapted to mold a molded article P having an undercut portion P3 using the mold 10. The mold 10 comprises a stationary mold 11 for molding the outer appearance portion of the molded article P and a movable mold 14 for molding the inside of the molded article P.

Figure 8:
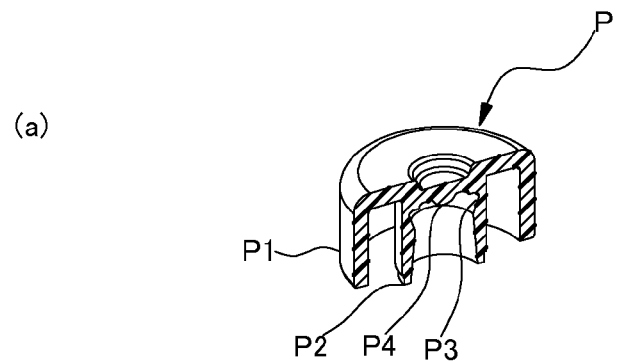
FIG. 8 includes (a) a longitudinally cross-sectioned view of a molded article punched out with the undercut processing mechanism according to the embodiment of the present invention and (b) a perspective view showing a state in which the upper holder, ejector pins and slide members have been combined.
Figure 8:
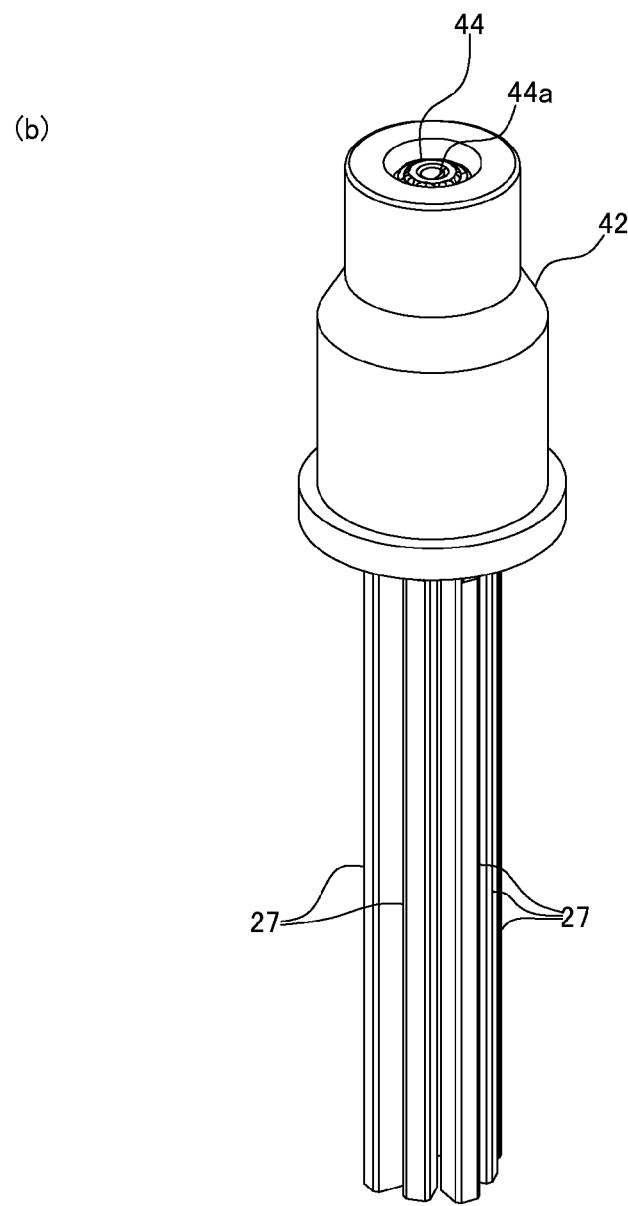

The molded article P in the present embodiment is a bottomed cap-shaped member that has a dual structure comprising an outer periphery P1 and a cylindrical portion P2 formed inside an opening separately from the outer periphery P1, as shown in FIG. 8. The cylindrical portion P2 is provided in the penetralia thereof with the undercut portion P3 spreading in the circumferential direction, with the axis of the molded article P as a center. In addition, the penetralia of the cylindrical portion P2 is provided with a convex portion P4 bulging along the center axis. Incidentally, the molded article P may be made of synthetic resin, such as plastic, or metal including iron.

As shown in FIG. 1, the stationary mold 11 comprises a stationary mold plate 12 constituting the principal part of the stationary mold 11 and a fixing attachment plate 13 for fixing the stationary mold plate 12. The stationary mold plate 12 is provided with a sprue portion 12a that is an inlet port for injecting a material into the mold 10. On the other hand, the movable mold 14 comprises an upper movable mold plate 16 and a lower movable mold plate 15 constituting the principal parts of the movable mold 14, a stripper plate 17 disposed separably upward of the upper movable mold plate 16 and a movable attachment plate 19 to be fixed below the lower movable mold plate 15 via a spacer block 18.

Figure 6:
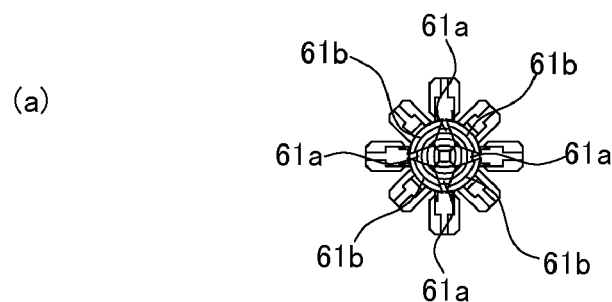
FIG. 6 is a perspective view showing a state in which slide members and split cores of the undercut processing mechanism according to the present invention are disposed at a demolding position.
Figure 6:
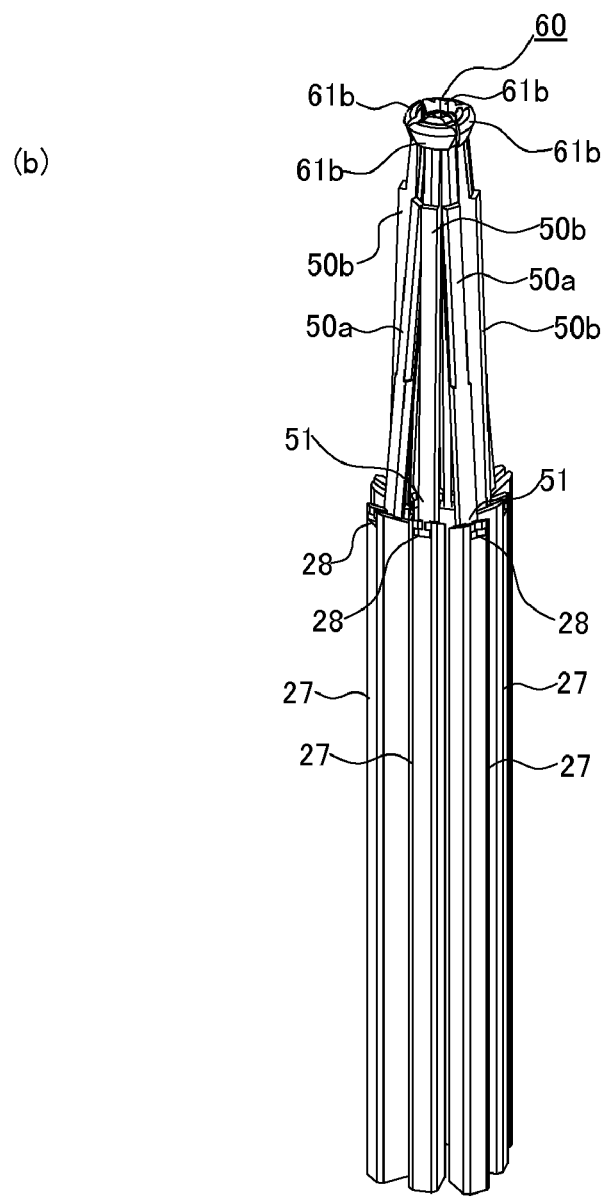

An ejector bedplate 20, a two-stage push-out unit 21 and a push-out plate 25 are disposed between the upper movable mold plate 16 and the movable attachment plate 19. Eight ejector pins 27 in total are disposed upright on the ejector bedplate 20 so as to line radially. To be specific, as shown in FIG. 6, the ejector pins 27 are disposed upright so as to line alternately on the inside and outside. Each ejector pin 27 comprises a square bar member and has the proximal end thereof fixed to the ejector bedplate 20 via a knock pin. The leading end of each ejector pin 27 slidably passes into a holder 40 to be described later.

The ejector pin 27 is driven in a punching-out direction in association with up-and-down movement of the ejector bedplate 20. The two-stage push-out unit 21 is a unit for driving the stripper plate 17, when the ejector bedplate 20 has ascended to a prescribed height position, so as to shake off the stripper plate 17 further upward. Specifically, as shown in FIG. 1, the two-stage push-out unit 21 has the opposite ends shaken, with a pivot 22 as a fulcrum, and is set so that when a point-of-effort roller 23 on one end generally directed upward is engaged with a step 18a of the spacer block 18, with the ejector bedplate 20 ascending, a point-of-load roller 24 on the other end is shaken upward, with the pivot 22 as the fulcrum, to move the push-out plate 25 further upward.

A guide pin 26 is disposed upright on the push-out plate 25, passes through vertical holes 14a bored in the upper movable mold plate 16 and lower movable mold plate 15 and has the leading end thereof connected to the stripper plate 17. That is to say, the stripper plate 17 is configured to break away from the lower movable mold plate 15 and ascend in association with ascent of the push-out plate 25 by the two-stage push-out unit 21. Incidentally, the push-out plate 25 has a vertical hole 25a which is bored therein and through which each ejector pin 27 can pass.

The undercut processing mechanism 30 constituting the essential part of the present invention comprises the ejector pins 27 driven in the vertical direction that is the punching-out direction to pull out, holder 40 disposed within the movable mold 14, with the leading ends of the ejector pins 27 slidably guided, slide members 50 prepared in the same number as that of the ejector pins 27 and disposed radially within the holder 40 to face the center axis of the holder 40, and an undercut mold core 60 provided on the leading end of each slide member 50.

As shown in FIG. 1, the holder 40 is divided into two and comprises in combination an lower holder 41 that is disposed integrally inside the lower movable mold plate 15 of the movable mold 14 and an upper holder 42 that is disposed as fixed integrally to the upper movable mold plate 16 and has a section projecting upward of the upper movable plate 16 passed through the stripper plate 17 and fitted into the stationary mold plate 12. The lower holder 41 comprises a substantially circular cylindrical member to be bolted in a state piercing the lower movable mold plate 15 and is provided therein with eight vertical holes 43 in total bored to line radially and face the axis of the holder 40 for slidably guiding the eight ejector pins 27 in total in the punching-out direction (vertical direction).

Figure 7:
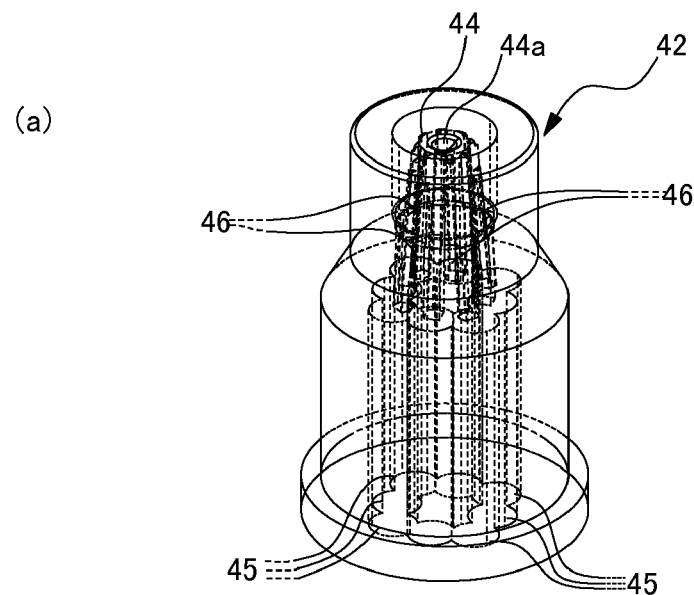
FIG. 7 includes (a) a perspective view and (b) a longitudinally cross-sectioned view showing an upper holder of the undercut processing mechanism according to the embodiment of the present invention.
Figure 7:
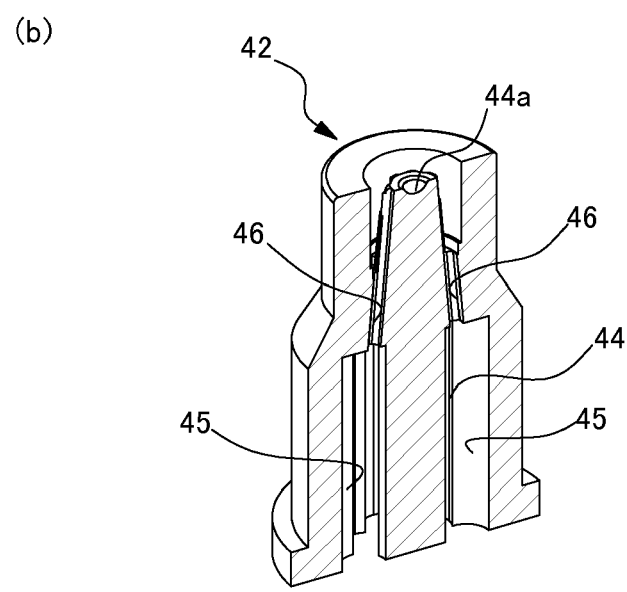

As shown in FIGS. 7 and 1, the upper holder 42 is a substantially circular cylindrical member with two stages comprising a section that pierces the upper movable mold plate 16 and has a large diameter and a section that becomes small in diameter from midway the section projecting upward of the upper movable plate 16 and is provided therein at the center thereof with an axial portion 44. The round of the axial portion 44 at the large-diameter section of the upper holder 42 has vertical holes 45 bored therein for permitting the leading ends of the ejector pins 27 to slidably pass thereinto and in a state in which interior spaces of the vertical holes 45 continue into one another. In addition, the axial portion 44 is provided in the upper end face thereof with a concave portion 44a for forming the convex portion P4 of the molded article P.

The round of the axial portion 44 at the small-diameter section of the upper holder 42 has eight guide holes 46 bored therein, which extend obliquely and is situated nearer the center axis so as to tuck one another upward from the upper end of the vertical holes 45 and through which the slide members 50 to be described later are slidably passed, respectively. Incidentally, the small-diameter section of the upper holder 42 and the inside axial portion 44 form a telescopic structure for shaping the inside including the cylindrical portion P2 of the molded article P and, in particular, the upper outer periphery of the axial portion 44 forms a guide surface along which the slide members 50 move.

Figure 4:
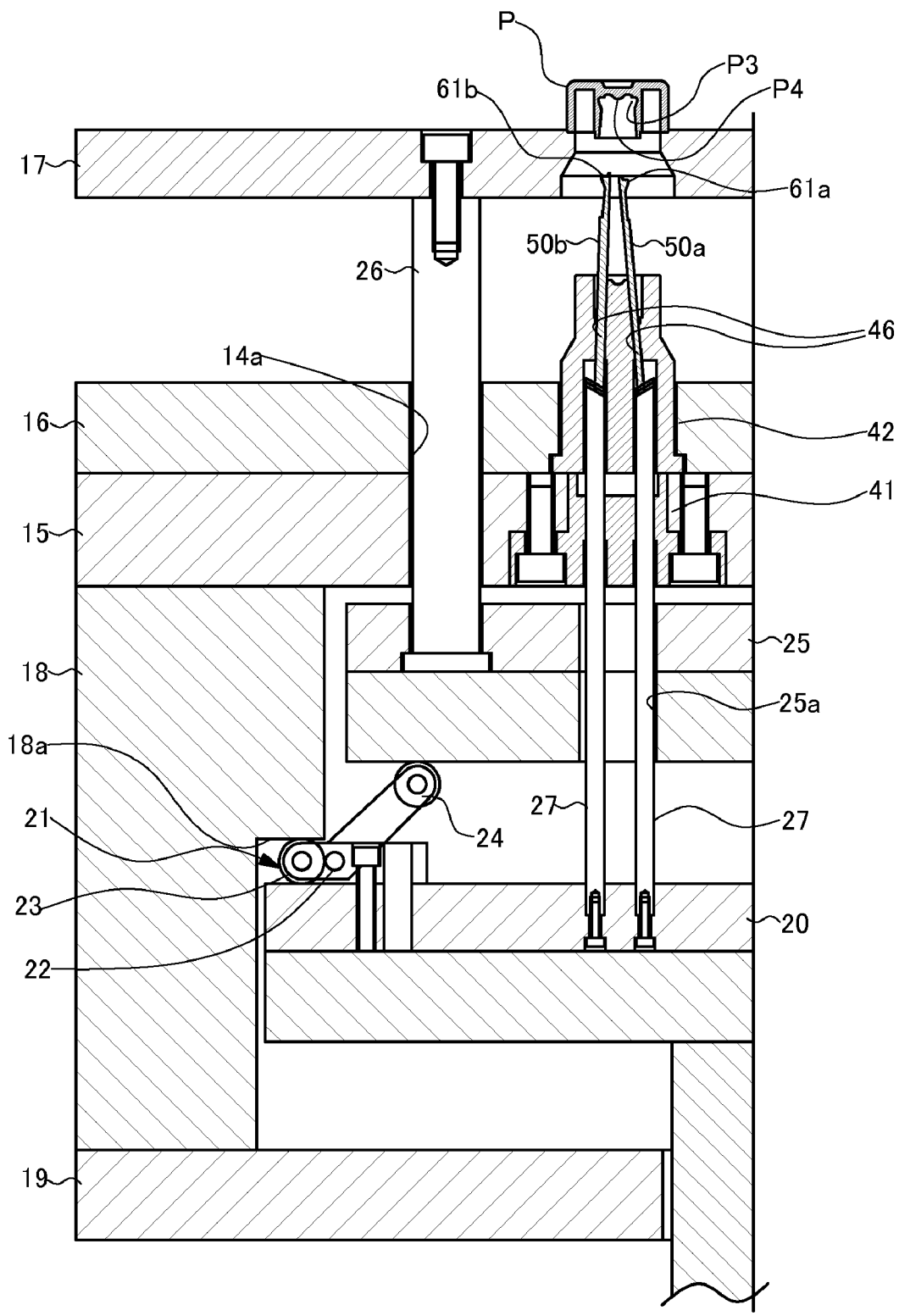
FIG. 4 is a cross-sectional view illustrating the molding device and the movement of the undercut processing mechanism at a final stage at which the projector pins have projected, according to the embodiment of the present invention.
Figure 5:
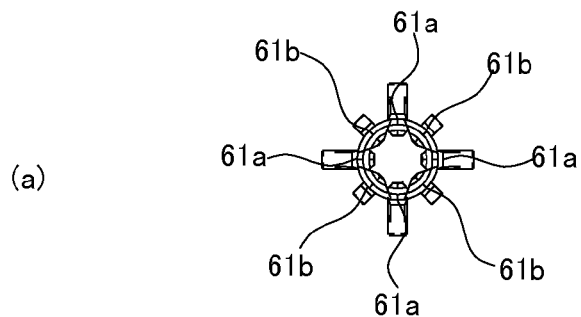
FIG. 5 is a perspective view showing a state in which slide members and split cores of the undercut processing mechanism according to the present invention are disposed at a molding position.
Figure 5:
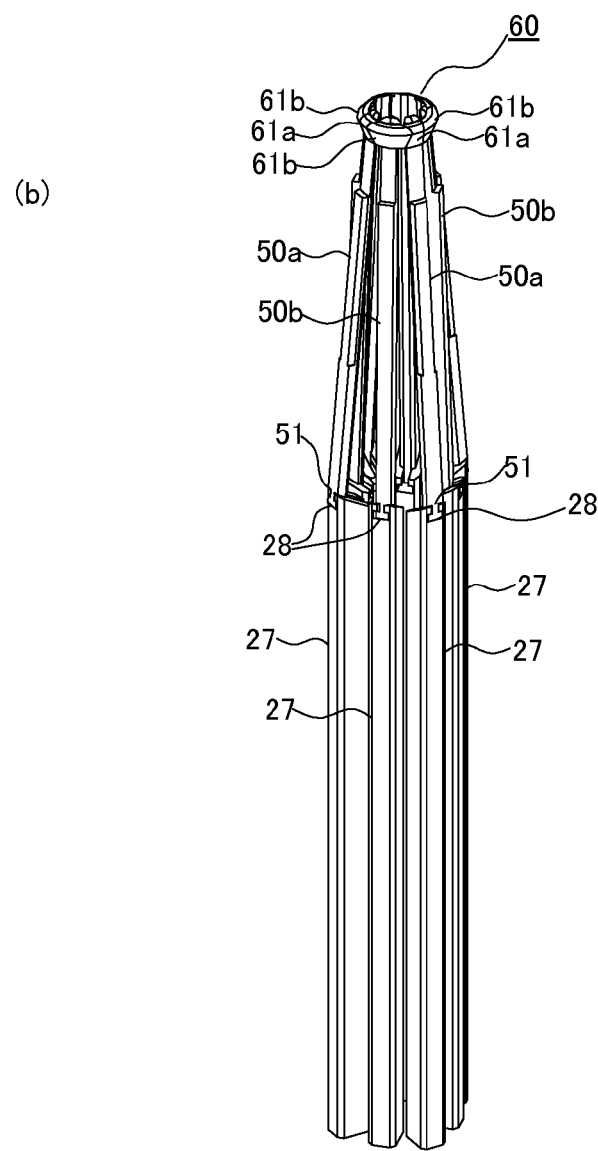

As shown in FIGS. 1 and 5, the slide members 50 are housed in the holder 40 so as to slidably move between a molding position (refer to FIG. 1) at which the leading ends of the slide members line one another in the entire circumferential direction inside the upper holder 42 and a demolding position (refer to FIG. 4) at which the leading ends are reduced in diameter one another outside the upper portion of the upper holder 42. The number of the slide members 50 is eight in total corresponding to the number of the ejector pins 27.

Figure 9:
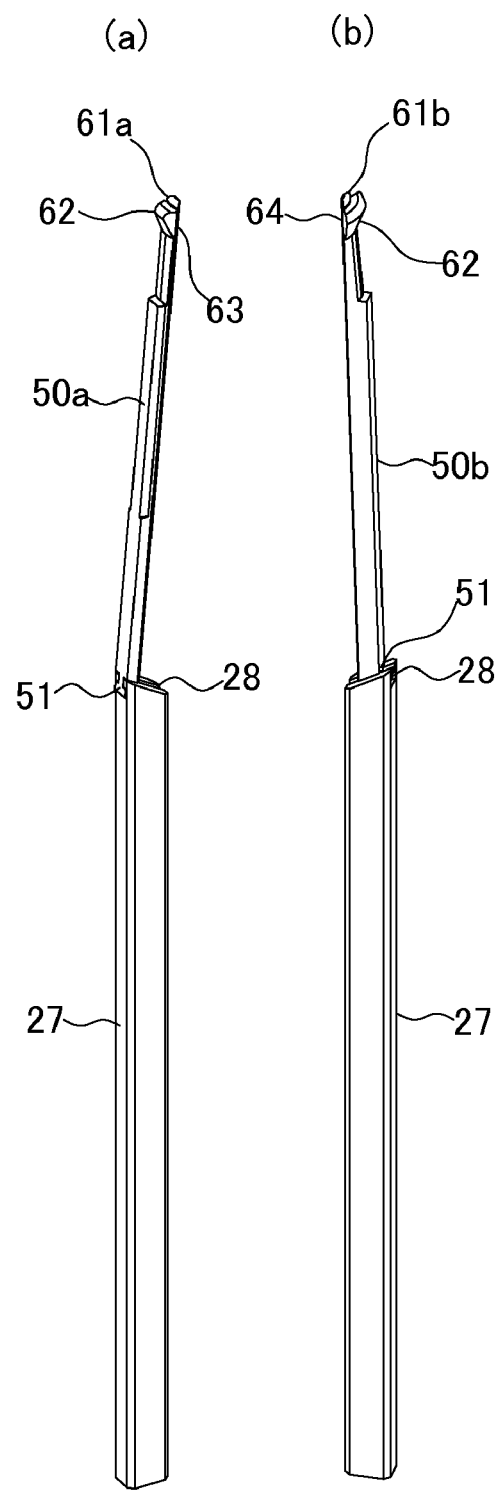
FIG. 9 includes perspective views showing two kinds of ejector pins, slide members and split cores of the undercut processing mechanism according to the embodiment of the present invention.
Figure 10:
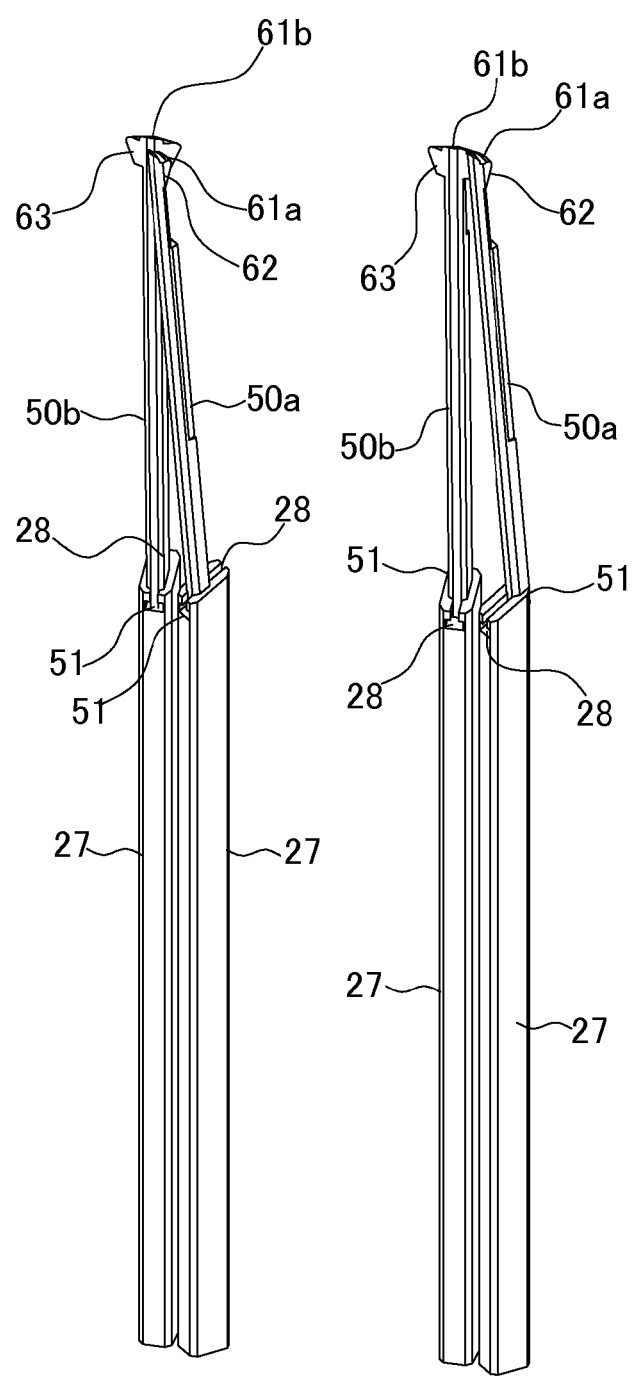
FIG. 10 includes (a) a perspective view showing a state in which the two kinds of ejector pins, slide members and split cores of the undercut processing mechanism according to the embodiment of the present invention have been disposed at a demolding position and (b) a perspective view showing a state in which they have been disposed at the molding position.

As shown in FIGS. 1, 6 and 9, each slide member 50 is made from a bar member shown in figures and has the proximal end connected to leading end of the ejector pin 27 so as to be slidable in a direction escaping from the undercut portion P3 (direction inclined relative to the lateral direction in FIG. 1) and intersecting with the punching-out direction (vertical direction in FIG. 1). The ejector pin 27 is provided on the leading end thereof with a retaining piece 28. On the other hand, the slide member 50 is provided on the proximal end thereof with an escaping piece 51 connected to the retaining piece 28 so as to be slidable in the escaping direction.

As shown in FIG. 6, the retaining piece 28 of the ejector pin 27 is formed in the upper end face of the ejector pin 27 as a dovetail grove extending in the escaping direction obliquely intersecting with the axial direction of the ejector pin 27 (vertical direction in FIG. 6). On the other hand, the escaping piece 51 of the slide member 50 is formed on the lower end face of the slide member 50 as a convex strip engaged with the dovetail groove of the retaining piece 28 so as to be movable in the escaping direction. The retaining piece 28 and escaping piece 51 are connected so as to be capable of pushing and pulling each other.

As shown in FIGS. 9 and 1 in detail, each slide member 50 comprises two kinds of slide members, i.e. a slide member 50a that is a bar member having a small width and is connected to the ejector pins 27 disposed to line inside alternately of the aforementioned ejector pins 27 and a slide member 50b that is a bar member having a large width and is connected to the ejector pins 27 disposed to line outside alternately of the aforementioned ejector pins 27. The small-width slide member 50a corresponds to an inner split core 61a of the undercut mold core 60 to be described later and the large-width slide member 50b corresponds to an outer split core 61b of the undercut mold core 60.

As described above, each slide member 50 slidably pierces the guide hole 46, and the guide hole 46 (guide means) is set to guide each slide member 50 to move simultaneously in the punching-out direction parallel to the center axis of the undercut portion P3 and in the direction escaping from the undercut portion P3 obliquely toward the center axis of the undercut portion P3, respectively, along an inclination direction from the molding position shown in FIG. 1 toward the demolding position shown in FIG. 4 when punching out the molded article P. Incidentally, to be exact, each guide hole 46 also has two kinds of cross-sectional shapes corresponding to the small-width slide member 50a and the large-width slide member 50b.

As shown in FIGS. 1, 5, 6 and 9, the undercut mold core 60 is supported on the leading end of each slide member 50a, corresponds to the inner peripheral surface of the undercut portion P3 of the molded article P, and comprises a plurality of split cores 61 lining one another in the entire circumferential direction. As shown in FIGS. 5 and 6 in detail, each undercut mold core 60 comprises two kinds of split cores, i.e. the inner split cores 61a abutting on one another to be disposed inside and the outer split cores 61b close to one another along the outside of the inner split cores 61a when having been reduced in diameter toward the center lining in the circumferential direction, respectively.

One inner split core 61a and one outer split core 61b form a pair or a set and are disposed to line in the circumferential direction. That is to say, the inner split cores 61a and the same number of the outer split cores 61b line alternately by necessity. Any of the split cores 61 is disposed in a state supported on the leading end of each slide member 50 so as to be movable between the molding position at which the split cores 61 line one another in the entire circumferential direction and the demolding position at which the split cores 61 are reduced in diameter one another toward the center axis of the undercut portion P3. Here, each split core 61 is guided along the aforementioned inclination direction similarly to the movement of each slide member 50 when each split core 61 moves from the molding position to the demolding position.

While the slide member 50 is provided on the leading end thereof integrally with the split core 61 of the undercut mold core 60 according to the present embodiment, another configuration in which the split core 61 is detachably attached to the leading end of the slide member 50 as a separate body may be adopted. Incidentally, to be exact, the slide member 50a is provided on the leading end thereof with the inner split core 61a of each split core 61, and the slide member 50b is provided on the leading end thereof with the split core 61b.

As shown in FIG. 9, each split core 61 is provided on the outside thereof with molding surface 62 continuing to one another in the entire circumferential direction when it is disposed at the molding position. In addition, the inner split core 61a of each split core 61 is provided with a slid-contact surface 63 extending aslant from the opposite ends of the molding surface 62 toward the center axis of the undercut portion P3 so as to spread out wide toward the end. On the other hand, the outer split core 61b is provided with a sliding-contact surface 64 which extends aslant from the opposite ends of the molding surface 62 toward the center axis of the undercut portion P3 so as to tuck toward the end and which is brought into slide contact with the slid-contact surface 63.

Figure 2:
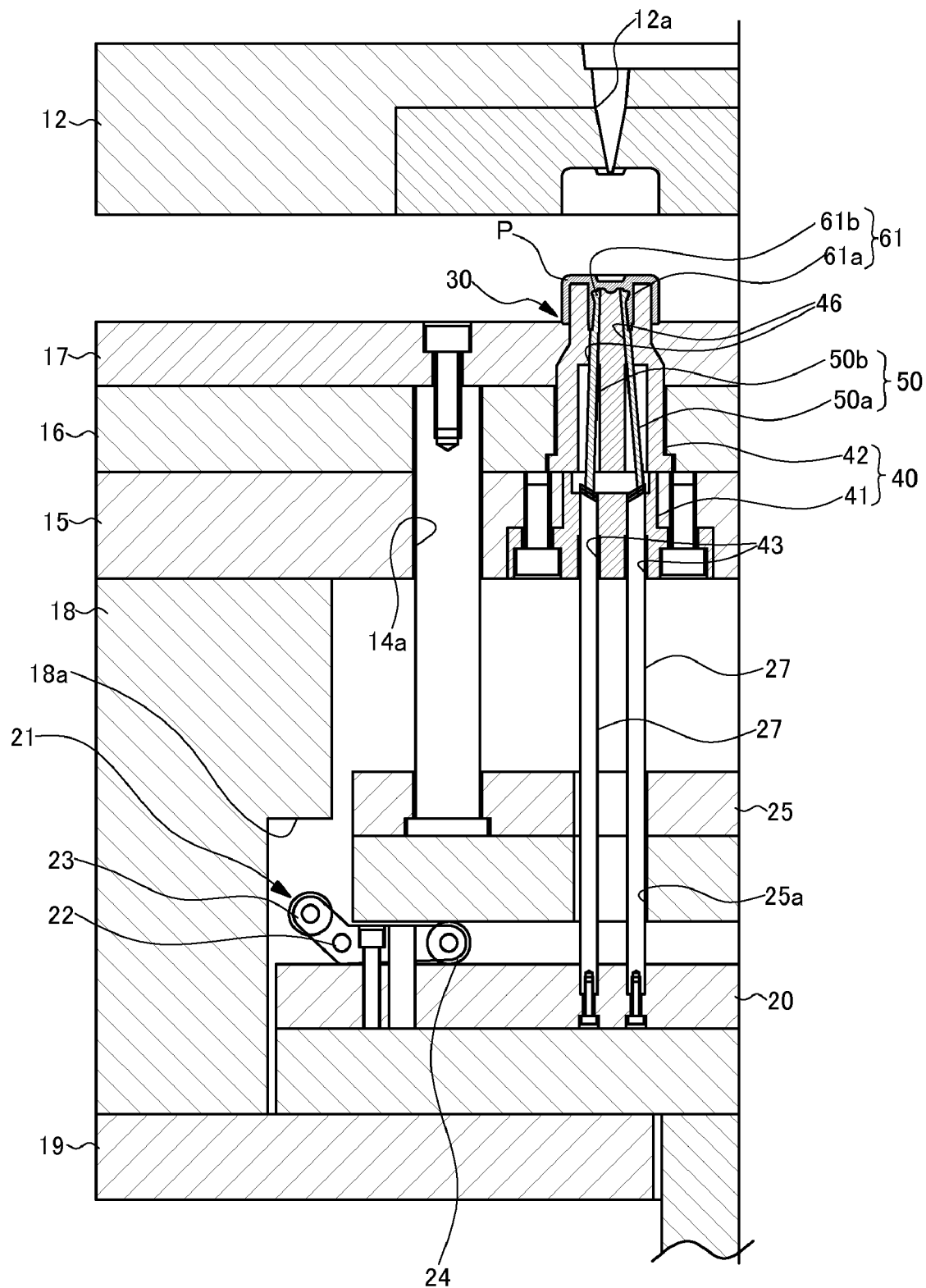
FIG. 2 is a cross-sectional view illustrating the molding device and the movement of the undercut processing mechanism during the course of splitting a stationary mold, according to the embodiment of the present invention.
Figure 3:
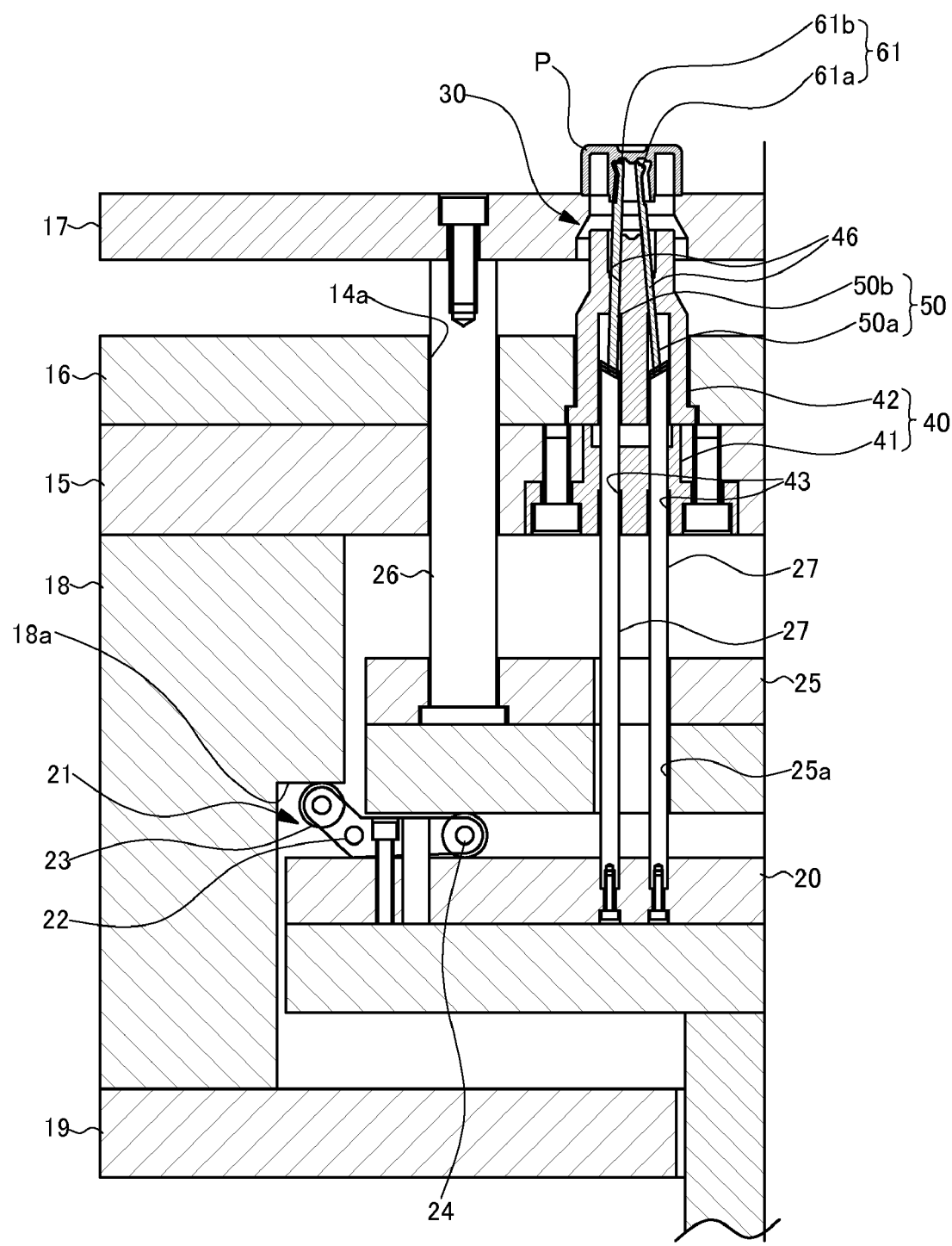
FIG. 3 is a cross-sectional view illustrating the molding device and the movement of the undercut processing mechanism at an initial stage at which ejector pins thereof project, according to the embodiment of the present invention.

The operation of the present embodiment will next be described. FIG. 1 shows the state in which the molded article P has been molded with the molding device 1. As shown in FIG. 2, when the stationary mold 11 separates from the movable mold 14 upon completion of the molding, the outside (outer appearance portion) of the molded article P is exposed onto the stripper plate 17. Subsequently, as shown in FIG. 3, when the ejector bedplate 20 has been driven upward, each ejector pin 27 disposed upright on the ejector bedplate 20 projects straightforward in the punching-out direction (upward), with the state having passed through the vertical hole 25a in the push-out plate 25 is maintained. In addition, the push-out plate 25 mounted on the two-stage push-out unit 21 on the ejector bedplate 20 also moves in situ in the punching-out direction (upward).

Here, in association with the movement of each ejector pin 27 in the punching-out direction (upward), within the holder 40, each slide member 50 connected to the leading end of each ejector pin 27 moves in the punching-out direction together with the ejector pin 27 and, at the same time, moves in the direction, toward the center axis of the undercut portion P3, escaping from the undercut portion P3. Each slide member 50 passes slidably through the guide hole 46 in the upper holder 42 and, in the presence of the guide hole 46, the slide member 50 is infallibly guided to move simultaneously in the punching-out direction and in the escaping direction, respectively, along the inclination direction from the molding position shown in FIG. 1 to the demolding position shown in FIG. 4.

Furthermore, in association with the movement of the push-out plate 25 in the punching-out direction (upward), the guide pin 26 disposed upright on the push-out plate 25 projects straightforward in the punching-out direction (upward), with the state having passed through the vertical hole 14a in the movable mold 14 is maintained. As a result, the stripper plate 17 supported on the guide pin 26 moves in the punching-out direction (upward) to punch out the molded article P from above the upper holder 42 forming a telescopic structure in conjunction with the movable mold 14. At this time, i.e. at the time shown in FIG. 3, the slide member 50 and undercut mold core 60 do not reach the demolding position, and the undercut mold core 60 is not yet punched out from the convex portion P4 of the molded article P.

Subsequently, as shown in FIG. 4, when the ejector bedplate 20 is driven further upward, the slide member 50 moves to the demolding position through the ejector bedplate 20. With this, the undercut mold core 60 on the leading end of each slide member 50 comes to move from the molding position (refer to FIG. 1) at which the split cores 61 thereof line each other in the entire circumferential direction to the demolding position (refer to FIG. 4) at which the split cores 61 are reduced in diameter toward the center axis of the undercut portion P3.

To be specific, in FIGS. 5 and 6, when each split core 61 has moved from the molding position to the demolding position, the outer split core 61b is disposed above the outside of the inner split core 61a while bringing the slide-contact surface 64 (refer to FIG. 9) of the outer split core 61b into slide contact with the slid-contact surface 63 (refer to FIG. 9) of the inner split core 61a. According to this configuration, it is possible to heighten the ratio of diameter reduction of the undercut mold core 60 and, even in the case where the molded article P is provided with the undercut portion P3 spreading deeply inward in the circumferential direction, the molded article P can easily be punched out without forcibly performing punching-out.

Here, the direction escaping from the undercut portion P3 in each split core 61 is not a direction at right angles relative to the punching-out direction, but in brief a direction intersecting aslant with the punching-out direction toward the center axis of the undercut portion P3. For this reason, even the undercut portion P3 having a shape incapable of being punched out in the direction intersecting at right angles with the punching-out direction can easily be punched out to enable undercut portions having various shapes spreading inward of the molded articles P in the circumferential direction to be punched out with ease.

Furthermore, though the molded article P in the present embodiment is provided on the inner surface at the center with the convex portion P4 bulging downward, the undercut mold core 60 is reduced in diameter not in the direction intersecting at right angles with the axial direction of the undercut portion P3, but in the direction intersecting aslant with the axial direction while moving in the same direction. Therefore, the punching-out can easily be performed without interfering the convex portion P4. Incidentally, since the core movement in conventional ordinary undercut processing devices is limited to the direction at right angles relative to the punching-out direction, in the presence of the structure such as the convex portion P4, it has been impossible to perform the punching-out because of interference with the convex portion P4.

In addition, in FIG. 4, when the ejector bedplate 20 is driven further upward, the point-of-effort roller 23 of the two-stage punch-out unit 21 on the ejector bedplate 20 is engaged with the step 18a of the spacer block 18 to shake upward the point-of-load roller 24 on the opposed end side, with the pivot 22 as the fulcrum. The push-out plate 25 pushed by the point-of-load roller 24 moves greatly further upward to cause the guide pin 26 to project upward. As a result, the stripper plate 17 supported on the guide pin 26 moves in the punching-out direction (upward) to allow the molded article P to break away completely from the undercut mold core 60.

As described above, since each slide member 50 supporting the undercut mold core 60 thereon is guided via the guide hole 46 in the holder 40 and moves in the inclination direction capable of performing the punching-out in association of the projection movement of the ejector pin 27 driven in the punching-out direction, it is possible to make the whole structure simple and reduce the manufacturing cost to a great extent. Incidentally, when the molded article P has been punched out, the slide member 50 and undercut mold core 60 are pulled by the ejector pin 27 in proportion as the ejector pin 27 returns to the molding position to allow the slide member 50 and undercut mold core 60 to return to the initial position. In addition, the stationary mold 11 returns also to the molding position and a subsequent molded article P comes to be molded.

In the meantime, by setting the slide member 50 to have a length corresponding to a punching-out stroke of the molded article P, it is possible to reply appropriately to a range of a large stroke to a small stroke in punching out the molded article P. In addition, the sections of the slide member 50 and holder 40 brought into slide contact with each other, particularly the inner surface of the guide hole 46, are subjected to nitriding treatment to enable a friction coefficient to be reduced and attain further smooth movement.

Incidentally, though the embodiment of the present invention has been described with reference to the drawings, the present invention is not limited to the concrete configuration of the embodiment, but includes configurations having modifications and additions in the range without departing from the gist of the present invention. For example, the shapes of the molded article P and undercut mold core 60 are not limited to those shown concretely. In addition, the movable mold 14 is provided integrally with the holder 40 in the aforementioned embodiment. However, not the movable mold 14 but the stationary mold 11 may be provided integrally with the holder 40.

Furthermore, though the outer peripheral shape of the holder 40 has been described as the circular cylindrical shape in the aforementioned embodiment, it may be designed to have a quadrangular prism shape. In addition, though the number of slide members 50 has been described as eight in total, it may be an even number, four or six, for example, and a proper even number of slide members 50 may be provided in accordance with the size of an array space within the holder. In further addition, though the molding surfaces 62 of the undercut mold cores 60 having the same shape have been used, a configuration in which the shape of at least one molding surface 62 per slide member 50 differs from the shapes of other molding surfaces may be adopted.

In the aforementioned embodiment, since the slide member 50 is provided on the leading end thereof integrally with the split core 61 of the undercut mold core 60, it is possible to make the structure further simple and attain cost reduction. An adoption of a configuration in which a separate split core 61 is detachably attached to the leading end of the slide member 50 as a separate body enables various kinds of undercut mold cores 60 to be instead attached to the leading end, thereby expanding the versatility thereof.

Furthermore, in the aforementioned embodiment, though the guide hole 46 has been bored in the holder 40 as guide means for guiding each slide member 50 to move simultaneously in the punching-out direction and in the escaping direction, respectively, along the inclination direction, an inclined strip formed on the slide member 50 and an inclined groove formed in the holder 40 in which the inclined strip is fitted are used, for example, as the guide means for guiding the slide member 50 in the inclination direction. Otherwise, a groove formed in the holder 40 for slidably guiding the entire outer periphery of the slide member 50 may be used as the guide means.

Moreover, in the aforementioned embodiment, though the holder 40 has been formed as a separate body from the movable mold 14 (or stationary mold 11) and then combined integrally with it, the holder 40 per se may be formed as the movable mold 14 (or stationary mold 11). That is to say, it may be adopted that a hollow portion is formed directly in the mold 10 instead of the inner space of the holder 40 and that the slide members 50 are housed in the hollow portion slidably between the molding position and the demolding position. As a result, it is possible to reduce the number of parts for the holder 40, make the entire configuration of the molding device 1 further simple and attain cost reduction.

Industrial Applicability

According to the undercut processing mechanism of the present invention, undercut portions of various shapes spreading in the circumferential direction inside molded articles can be punched out with ease. Furthermore, it is possible to attain a compact configuration, reply to a demand for space saving, establish easy processing and incorporation relative to a mold, provide a simple structure, reduce labor and time for assemblage and realize cost reduction.

The invention claimed is:

1. An undercut processing mechanism (30) in a molding device (1) for molding an article (P) to be molded with a stationary mold (11) and a movable mold (14), the molded article (P) having an undercut portion (P3) formed inside it in a circumferential direction thereof at a time of punching out the molded article (P) and brought to a detachable state, comprising:

an undercut mold core (60) comprising plural split cores (61) that line one another in an entire circumferential direction to correspond in position to an inner peripheral surface of the undercut portion (P3), the split cores (61) comprising inner split cores (61a) and outer split cores (61b) formed to line alternately, the inner split cores (61a) abutting on one another and formed on an inner side and the outer split cores (61b) coming close to one another along an outer side of the inner split cores (61a) when the split cores (61) have been reduced in diameter toward an center axis of the undercut portion (P3);

slide members (50) radially disposed and opposed to the center axis of the undercut portion (P3) in a state in which each of the slide members (50) supports each of the split cores (61) of the undercut mold cores (60) on a leading end thereof;

a holder (40) provided integrally with the stationary mold (11) or movable mold (14) for housing the slide members (50) slidably between a molding position at which the split cores (61) supported on the leading ends of the slide members (50), respectively, line one another in the entire circumferential direction and a demolding position at which the split cores (61) are reduced in diameter one another toward the center axis of the undercut portion (P3);

guide means (46) disposed in the holder (40) for guiding, at the time of punching out the molded article (P), the slide members (50) to move simultaneously in a punching-out direction parallel to the center axis of the undercut portion (P3) and in a direction escaping from the undercut portion (P3) toward the center axis of the undercut portion (P3), respectively, along an inclination direction from the molding position to the demolding position; and ejector pins (27) driven in the punching-out direction to project out, wherein the holder (40) is integrally provided with the movable mold (14) in a state in which leading ends of the ejector pins (27) are movably guided, the slide members (50) have proximal ends thereof connected slidably in the escaping direction to the leading ends of the ejector pins (27), and the guide means (46) comprises guide holes (46) which are formed in the holder (40) and along which the slide members (50) are movably guided in the inclination direction, with midway portions of the slide members (50) passing through the guide holes (46).

2. An undercut processing mechanism (30) according to claim 1, wherein the split cores (61) are provided on outer sides thereof with molding surfaces (62) continuing to one another in the entire circumferential direction at the molding position; the inner split cores (61*a*) of the split cores (61) are provided with slide-contact surfaces (63) extending aslant from opposite ends of the molding surfaces (62) toward the center axis of the undercut portion (P3) so as to spread out wide toward ends thereof; the outer split cores (61*b*) of the split cores (61) are provided with sliding-contact surfaces (64) which extend aslant from the opposite ends of the molding surfaces (62) toward the center axis of the undercut portion (P3) so as to tuck toward ends thereof and which are brought into slide contact with the slid-contact surfaces (63); and when the split cores (61) have moved from the molding position to the demolding position, respectively, the sliding-contact surfaces (64) of the outer split cores (61*b*) come into slide contact with the slid-contact surfaces (63) of the inner split cores (61*a*) to dispose the outer split cores (61*b*) on upper outside of the inner split cores (61*a*).

3. An undercut processing mechanism (30) according to claim 1, wherein the split cores (61) of the undercut mold core (60) are formed integrally on leading ends of the slide members (50) corresponding thereto, respectively.

4. An undercut processing mechanism (30) according to claim 1, wherein the split cores (61) of the undercut mold core (60) are detachably combined as separate bodies with leading ends of the slide members (50) corresponding thereto, respectively.

5. An undercut processing mechanism (30) according to claim 1, wherein the slide members (50) are set to have a length corresponding to a punching-out stroke of the molded article (P).

6. An undercut processing mechanism (30) according to claim 1, wherein the holder (40) per se is constituted as the movable mold (14) or stationary mold (11) provided therein with the holder (40).

* * * * *